United States Patent
Kim

(10) Patent No.: US 9,153,976 B2
(45) Date of Patent: Oct. 6, 2015

(54) SYSTEM AND METHOD OF BATTERY TEMPERATURE CONTROL

(71) Applicant: Samsung SDI Co., Ltd, Yongin, Gyeonggi-do (KR)

(72) Inventor: Ki-Seon Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 278 days.

(21) Appl. No.: 13/924,383

(22) Filed: Jun. 21, 2013

(65) Prior Publication Data

US 2014/0210417 A1 Jul. 31, 2014

(30) Foreign Application Priority Data

Jan. 28, 2013 (KR) .................. 10-2013-0009090

(51) Int. Cl.
*H02J 7/00* (2006.01)
*H02J 3/32* (2006.01)
*H02J 7/04* (2006.01)

(52) U.S. Cl.
CPC .............. *H02J 7/0029* (2013.01); *H02J 3/32* (2013.01); *H02J 7/047* (2013.01)

(58) Field of Classification Search
CPC ...... Y02E 60/12; H01M 10/44; H02J 7/0093; H02J 7/0075; Y02T 10/7005
USPC .................................................. 320/130
See application file for complete search history.

(56) References Cited

U.S. PATENT DOCUMENTS

| | | | |
|---|---|---|---|
| 4,688,160 A * | 8/1987 | Fraidlin | 363/21.02 |
| 5,654,621 A * | 8/1997 | Seelig | 320/108 |
| 6,124,700 A * | 9/2000 | Nagai et al. | 320/132 |
| 6,340,879 B1 | 1/2002 | Bläcker | |
| 8,069,100 B2 * | 11/2011 | Taylor et al. | 705/34 |
| 8,169,340 B2 * | 5/2012 | Oyobe et al. | 340/932.2 |
| 2002/0191422 A1 * | 12/2002 | Takagi et al. | 363/21.06 |
| 2005/0253557 A1 * | 11/2005 | Yao | 320/128 |
| 2010/0181963 A1 * | 7/2010 | Schreiber | 320/108 |
| 2010/0259241 A1 * | 10/2010 | Cuk | 323/311 |
| 2011/0031927 A1 * | 2/2011 | Kajouke et al. | 320/108 |
| 2011/0038184 A1 * | 2/2011 | Sutardja et al. | 363/21.17 |
| 2011/0227534 A1 * | 9/2011 | Mitsutani | 320/109 |
| 2011/0291606 A1 | 12/2011 | Lee | |
| 2012/0013192 A1 | 1/2012 | Park et al. | |
| 2012/0091970 A1 * | 4/2012 | Cho et al. | 320/160 |

(Continued)

FOREIGN PATENT DOCUMENTS

| | | |
|---|---|---|
| JP | 2000-228231 A | 8/2000 |
| KR | 10-2011-0131805 A | 12/2011 |
| KR | 10-2012-0007224 A | 1/2012 |

*Primary Examiner* — Arun Williams
(74) *Attorney, Agent, or Firm* — Knobbe, Martens, Olson & Bear LLP

(57) ABSTRACT

A temperature control system for a battery in an energy storage system is disclosed. In one aspect, the temperature control system includes a circuit configured to determine that the temperature of the battery has been maintained below a normal operation temperature for a predetermined duration. The circuit is further configured to alternatingly repeat charging and discharging operations using a winding in a primary side of an inverter to generate reactive current to flow in opposite directions through the battery until the temperature of the battery is restored to the normal operation temperature.

15 Claims, 3 Drawing Sheets

(56) References Cited

U.S. PATENT DOCUMENTS

| | | | |
|---|---|---|---|
| 2012/0200263 A1* | 8/2012 | Masuda | 320/130 |
| 2012/0313572 A1* | 12/2012 | Sheu | 320/107 |
| 2013/0162203 A1* | 6/2013 | Kamata | 320/108 |
| 2013/0293192 A1* | 11/2013 | Abe et al. | 320/108 |
| 2014/0028106 A1* | 1/2014 | Chen et al. | 307/104 |
| 2014/0354240 A1* | 12/2014 | Wang et al. | 320/136 |

* cited by examiner

SYSTEM AND METHOD OF BATTERY TEMPERATURE CONTROL

CROSS-REFERENCE TO RELATED APPLICATIONS

This application claims priority to and the benefit of Korean Patent Application No. 10-2013-0009090, filed on Jan. 28, 2013, in the Korean Intellectual Property Office, the entire content of which is incorporated herein by reference.

BACKGROUND

1. Field

The disclosed technology relates to a temperature control system and a temperature control method of a battery in an energy storage system.

2. Description of the Related Technology

Interest in renewable energy and cooperative storage systems continues to grow for both economic and environmental reasons. Renewable energy can take on various forms, including solar energy, wind energy, geothermal energy, among others. Various factors, including increasing gasoline prices and changes in the global climate have fueled much research and development in various aspects of renewable energy. One such aspect is energy storage systems.

An energy storage system generally includes a storage unit in the form of a battery. The energy storage system can be part of an interconnected network for delivering electricity from suppliers to consumers called an electrical grid. As part of a grid, the energy storage system will store electrical energy when production exceeds consumption, and will supply the stored energy at a later point in time when consumption exceeds production.

Batteries provided in energy storage systems are implemented in the form of rechargeable secondary batteries. Because batteries utilize electrochemical reactions, whose reaction rates often depend exponentially on temperature, maintaining the temperature at which the battery operates can have a large impact on the generated power. For example, a battery that operates at a low temperature (e.g., −20° C. or less) can generate as little as 16% of the power that would otherwise be generated if the battery was operated at a normal operating temperature. In order to prevent power generation from falling at low operating temperatures, various methods have been proposed to maintain the battery temperature within its normal operating temperature. For example, heat generated through dissipation of energy in a resistive load outside of the battery has been employed as one way of maintaining operating temperature. Heat generation via a resistive load has certain drawbacks, for example, including excessive heat which can lead to fire hazard. Therefore, there is a need for a battery temperature control system that does not rely on external resistive heating.

SUMMARY OF CERTAIN INVENTIVE ASPECTS

Embodiments provide a battery temperature control system in an energy storage system, in which a switch is configured to control the charging/discharging current paths of the battery to control the temperature of the battery.

Embodiments also provide a temperature control method of a battery including determining that the temperature of the battery has been maintained below a normal operation temperature for a predetermined duration and decoupling a load and a grid from the temperature control system, and subsequently providing charging/discharging current to the battery through the generation of reactive power at a primary side of an inverter implemented with an insulated full-bridge circuit, thereby increasing the temperature of the battery.

A battery temperature control system according to one embodiment includes a battery and a converter electrically connected to the battery. The converter comprises first and second switches and a first inductor, and configured to boost or drop an output voltage of the battery into an output voltage of converter. The battery temperature control system additionally includes a DC linker electrically connected to the converter and comprises a first capacitor. The DC linker is configured to stabilize the output voltage of the converter. The battery temperature control system further includes an inverter electrically connected to the DC linker and comprising a non-contact transformer. The non-contact transformer comprises a first winding on a primary side and a second winding on a secondary side, where the first and second windings are separated from each other by a gap. The non-contact transformer further includes first to fourth switches provided on the primary side and a fifth switch and a second inductor provided on the secondary side.

In one embodiment, the battery temperature control system is configured such that a first end of the first inductor is connected to a first terminal of the battery, the first switch of the converter is between a second end of the first inductor and a first plate of the first capacitor such that the first switch of the converter is configured to connect the first terminal of the battery to the first plate of the linker capacitor when switched on. In addition, the second switch is configured to connect the second end of the first inductor and a second terminal of the battery when switched on.

In another embodiment, the converter of the battery temperature control system further includes a third switch connected in parallel to the first inductor and is configured to directly connect the first terminal of the battery to the first plate of the first capacitor when switched on.

In another embodiment, the inverter of the battery temperature control system is configured such that the first to fourth switches on the primary side of the inverter form a full-bridge structure. In this embodiment, the first switch of the inverter is electrically connected between the first plate of the first capacitor and a first end of the first winding, the second switch of the inverter is electrically connected between the first end of the first winding and the second terminal of the battery, the third switch of the inverter is electrically connected between the first plate of the first capacitor and a second end of the first winding, and the fourth switch of the inverter is electrically connected between the second end of the first winding and the second terminal of the battery.

In another embodiment, the inverter of the battery temperature control system is configured such that the fifth switch of the inverter is between the second winding and the second inductor, where the fifth switch is configured to connect the second winding and the second inductor in series.

In another embodiment, the inverter of the battery temperature control system further includes a diode between the fifth switch and the second the inductor. The diode can be configured to be in series with the second winding when the fifth switch is switched on and forward biased when a current flows in a direction from the second winding towards the second inductor through the diode.

In another embodiment, the inverter of the battery temperature control system further comprises a second capacitor configured to be connected to a first end and a second end of the second winding through the second inductor when the fifth switch is switched on.

A temperature control method of a battery in an energy storage system according to one embodiment includes determining that the temperature of the battery has been maintained below a normal temperature for a predetermined duration and decoupling a secondary side from a primary side of a non-contact transformer of an inverter in the energy storage system, where the primary side includes a winding having a first end and a second end. The method additionally includes performing a charging operation by forming a charging current path through which a charging current generated by an inductance of the winding flows in a charging direction from a first end of the winding through the second end of the winding towards a first terminal of the battery. The method additionally includes performing a discharging operation by forming a discharging current path through which a discharging current generated by the inductance of the winding flows in a discharging direction from a first end of the winding through the second end of the winding towards a second terminal of the battery. The method further includes alternatingly repeating charging and discharging operations until the temperature of the battery has been restored to the normal temperature.

In one embodiment, alternatingly repeating charging and discharging operations in the temperature control method of the battery includes performing alternatingly switching a first pair of switches and a second pair of switches on the primary side.

In another embodiment, alternatingly repeating charging and discharging operations in the temperature control method involves the first pair of switches including a first switch configured to connect the first end of the winding and a first plate of a first capacitor when switched on and a fourth switch configured to connect the second end of the winding and a second plate of the first capacitor when switched on.

In another embodiment, alternatingly repeating charging and discharging operations in the temperature control method involves the second pair of switches including a second switch configured to connect the first end of the winding and a second plate of a first capacitor when switched on and a third switch configured to connect the second end of the winding and a first plate of the first capacitor when switched.

In another embodiment, the temperature control method further comprises decoupling a grid and a load from the energy storage system.

In yet another embodiment, the temperature control method further comprises coupling the load and the grid to the energy storage system after the temperature of the battery has been restored to the normal temperature and blocking the formed charging and discharging current paths.

BRIEF DESCRIPTION OF THE DRAWINGS

The accompanying drawings, together with the specification, illustrate exemplary embodiments of the present invention, and, together with the description, serve to explain different embodiments of the present invention.

DETAILED DESCRIPTION OF CERTAIN INVENTIVE EMBODIMENTS

Figure 1:
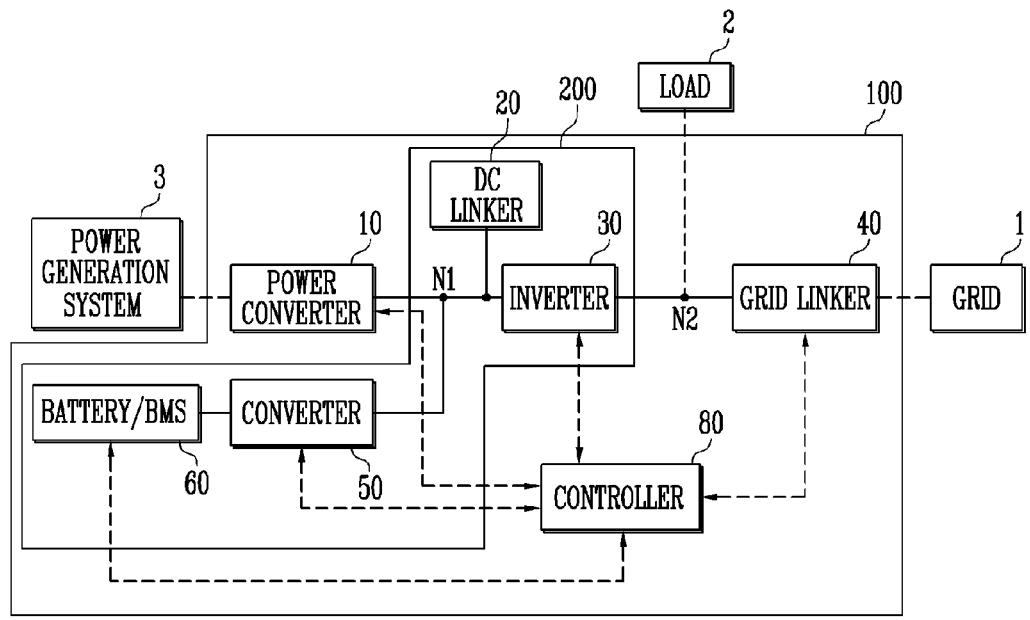
FIG. 1 is a block diagram illustrating an energy storage system including a battery temperature control system according to an embodiment of the present invention.

Hereinafter, certain exemplary embodiments according to the present invention will be described with reference to the accompanying drawings. Here, when a first element is described as being electrically connected to a second element, the first element may be not only directly electrically connected to the second element but may also be indirectly electrically connected to the second element via a third element. Further, some of the elements that are not essential to the complete understanding of the invention are omitted for clarity. Also, like reference numerals refer to like elements throughout.

FIG. 1 is a block diagram illustrating an energy storage system including a battery temperature control system according to one embodiment of the present invention. The battery temperature control system is configured to monitor and determine if the temperature of the battery has been maintained below a normal operation temperature for a predetermined duration. The battery temperature control system is further configured to restore the temperature of the battery to the normal operation temperature.

The energy storage system 100 of FIG. 1 is configured to supply electric power to a load 2 electrically connected with a power generation system 3 and a grid 1.

In one embodiment, the power generation system 3 can be a system that generates electric power using an energy source, e.g., a renewable energy source. The power generation system 3 supplies the generated electric power to the energy storage system 100. The power generation system 3 can include various power generation systems using renewable energy, such as a solar generation system, a wind power generation system, a tidal power generation system, a geothermal power generation system, among other renewable energy generation systems. For example, the power generation system 3 can include solar cells that generate electrical energy using solar energy that can be easily installed in homes or industrial factories. In some implementations, the power generation system 3 can include a plurality of power generation modules that are electrically connected in parallel to constitute part of a large-capacity energy system.

The grid 1 included power stations, transformer substations, power transmission lines, among other components of an electrical grid system. According to one embodiment, under normal operation, the grid 1 supplies electric power to the energy storage system 100 or the load 2, and receives electric power supplied from the energy storage system 100. Under certain circumstances, e.g., when a power failure occurs, the supply of electric power from the grid 1 to the energy storage system 100 or the load 2 can be interrupted, as well as the supply of the electric power from the energy storage system 100 to the grid 1.

The load 2 consumes electric power generated from the power generation system 3, electric power stored in a battery 60 within the energy storage system 100, or electric power supplied from the grid 1. For example, the load 2 may be a home, factory or the like.

The energy storage system 100 stores the electric power generated in the power generation system 3 in the battery 60, and can transmit the generated electric power to the grid 1. The energy storage system 100 can also transmit the electric power stored in the battery 60 to the grid 1 or store the electric power supplied from the grid 1 in the battery 60. Under some implementations, the energy storage system 100 can supply uninterrupted electric power to the load 2 by employing an uninterruptible power supply (UPS) e.g., under certain abnormal situations such as when a power failure of the grid 1 occurs. Under other implementations, the energy storage system 100 can supply, to the load, the electric power generated in the power generation system 3 or the power stored in the battery 60, even when the grid 1 is operating normally.

According to one embodiment, the energy storage system 100 includes a power converter 10, a DC linker 20, an inverter 30, a converter 50, a battery and battery management system (BMS) 60, a grid linker 40 and a controller 80. The inverter 30 and the converter 50 may be implemented as a bidirectional inverter 30 and a bidirectional converter 50, respectively.

Referring to FIG. 1, the power converter 10 is electrically connected between the power generation system 3 and a first node N1, and is configured to convert the electric power generated in the power generation system 3 into a DC voltage at the first node N1. The operation of the power converter 10 can change depending on the type of electric power generated in the power generation system 3. For example, when the power generation system 3 generates an AC voltage, the power converter 10 converts the AC voltage into the DC voltage at the first node N1. In another example, when the power generation system 3 generates a DC voltage, the power converter 10 boosts or drops the DC voltage to the DC voltage at the first node N1.

In one embodiment, where the power generation system 3 is a solar generation system, the power converter 10 can be a maximum power point tracking (MPPT) converter that detects the maximum power point according to a change in the amount of sunlight or a change in the temperature of solar heat and generates electric power. In addition, various kinds of converters or rectifiers may be used as the power converter 10.

The DC linker 20 is electrically connected between the first node N1 and the bidirectional inverter 30 and is configured to maintain a constant DC link voltage Vlink at the first node N1. The voltage level at the first node N1 may be unstable due to various factors including an instantaneous voltage drop of the power generation system 3 or the grid 1, an occurrence of a peak load in the load 2, etc. However, in order for the bidirectional inverter 30 and the bidirectional converter 50 to operate stably, the voltage at the first node N1 should be maintained at a constant value. Accordingly, in one embodiment, the DC linker 20 can include a capacitor such as an electrolytic capacitor, polymer capacitor or multi-layer ceramic capacitor (MLCC).

The battery 60 is configured to receive electric power generated in the power generation system 3 or electric power supplied from the grid 1 so as to store the received electric power, and configured to supply the stored electric power to the load 2 or the grid 1. The battery 60 may include at least one battery cell, and each battery cell may include a plurality of bare cells. The battery 60 may be implemented with various kinds of battery cells. For example, the battery 60 may be a nickel-cadmium battery, lead storage battery, nickel metal hydride battery (NiMH), lithium ion battery, and lithium polymer battery, among others.

The BMS is electrically connected to the battery 60, and is configured to control charging and discharging operations of the battery 60, and is in turn configured to be controlled by the controller 80. The BMS may perform an overcharging protection function, an overcurrent protection function, an overheating protection function, a cell balancing function, etc., so as to protect the battery 60. To this end, the BMS may monitor various parameters of the battery such as the voltage, the current, the temperature, the amount of remaining power, the lifespan, and charging state of the battery 60, among other parameters, and transmit relevant parametric information to the controller 80. Although the BMS in the embodiment of FIG. 1 is integrated with the battery 60 to be configured as part of a battery pack, a person skilled in the art will understand that the BMS may be provided as a separate unit.

The converter 50 is configured to convert a DC voltage corresponding to the outputted from the battery 60 into a DC input voltage level required by the inverter 30, i.e., the DC link voltage Vlink. The converter 50 is also configured to convert a DC voltage corresponding to a charging power transferred through the first node N1 into a voltage level required by the battery 60. The charging power can correspond to, for example, electric power generated in the power generation system 3 or electric power supplied from the grid 1 through the inverter 30.

The inverter 30 is configured as a power converter provided between the first node N1 and a second node N2 to which the load 2 or the grid linker 40 is connected. The inverter 30 converts the DC link voltage Vlink outputted from the power generation system 3 or the battery 60 into an AC voltage and output the converted AC voltage. When the power output from the grid 1 is being stored in the battery 60, the inverter 30 rectifies the AC voltage, converts the rectified AC voltage into the DC link voltage Vlink, and outputs the converted DC link voltage Vlink. The inverter 30 may include a filter for removing harmonics from the AC voltage output from the grid 1. In some implementations, the inverter 30 can include a phase locked loop (PLL) circuit for synchronizing the phase of the AC voltage output from the inverter 30 and the phase of the AC voltage output from the grid 1 in order to prevent the generation of reactive power. In other implementations, the inverter 30 can perform functions such as limiting voltage variation ranges, improving power factors, removing DC components, and protecting against transient electrical events, among other functions.

The grid linker 40 is connected between the grid 1 and the inverter 30. In one implementation, when abnormalities occur in the grid 1, the grid linker 40 is configured to intercept the link between the energy storage system 100 and the grid 1 under the control of the controller 80. The grid linker 40 may be implemented as a switching element, for example, a bipolar junction transistor (BJT), and a field effect transistor (FET), among other switches.

The energy storage system 100 of FIG. 1, includes a battery temperature control system 200 comprising, the battery 60, the converter 50, the DC linker 20 and the inverter 30 among.

The battery temperature control system 200 includes the inverter 30 is implemented with an insulated full-bridge circuit and a switch is added to a secondary side of the inverter 30. In this implementation, when the controller 80 determines that the temperature of the battery has been maintained below a normal operation temperature for a predetermined duration during the operation of the energy storage system 100, the controller 80 decouples to the grid 1 and the load 2, and alternatingly repeating charging and discharging operations are performed on the battery 60 through generation of reactive power at a primary side of the inverter 30 until the temperature of the battery has been restored to the normal operation temperature.

The battery temperature control system 200 according to this embodiment can further include a switch in the converter 50 and/or the DC linker 20, in addition to the switch added to the inverter 30, and configured to perform temperature controlling operations on the battery 60. The added switches can be controlled by the controller 80.

Figure 2:
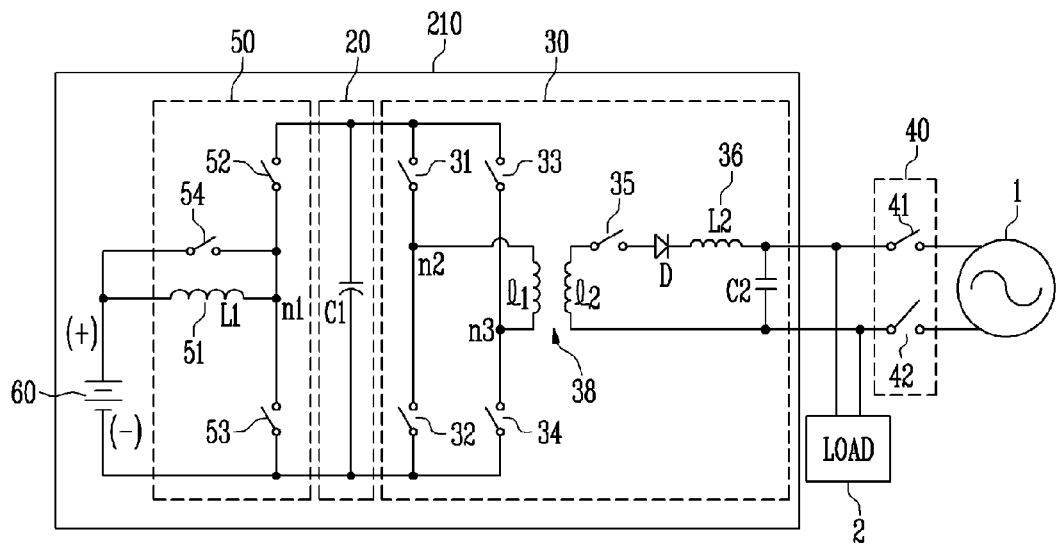
FIG. 2 is a circuit diagram illustrating the battery temperature control system in FIG. 1 according to one embodiment.

The configuration and operation of the battery temperature control system 200 according to this embodiment is now described detail with reference to FIGS. 2 and 3.

FIG. 2 is a circuit diagram illustrating the battery temperature control system of FIG. 1 according to one embodiment. Referring to FIG. 2, the temperature control system 210 according to this embodiment includes the battery 60, the converter 50 the DC linker 20, and the inverter 30. The load 2, connected to the temperature control system 210, the grid linker 40 and the grid 1 are shown in FIG. 2.

Although the battery 60 is shown in FIG. 2 without the BMS for the purpose of clarity of the illustration, it will be understood that the BMS can be included with the battery 60.

The converter 50, as shown in FIG. 2, includes first and second switches 52 and 53 and a first inductor 51 and is configured to perform a bidirectional converting operation. In addition, the converter 50 is additionally configured with a third switch 54 connected in parallel to the first inductor 51, thereby forming a charging/discharging current path directly connected to the battery 60 without passing through the first inductor 51.

The first inductor 51 may be implemented as a coil as shown in FIG. 2. The first inductor 51 includes a first end connected to a first terminal (e.g., a positive terminal) of the battery 60, and a second end connected to a node n1 between the first and second switches 52 and 53.

The first switch 52 couples a first plate of a first capacitor C1 included in the DC linker 20 and the second end of the first inductor 51. That is, a first end of the first switch 52 is connected to the first plate of the first capacitor C1, and a second end of the first switch 52 is connected to the second end of the first inductor 51.

The second switch 53 couples the second end of the first inductor 51, a second plate of the first capacitor C1 included in the DC linker 20 and a second terminal (e.g., a negative terminal) of the battery 60. That is, a first end of the second switch 53 is connected to the second end of the first inductor 51, and a second end of the second switch 53 is connected to the second plate of the first capacitor C1 and the second terminal of the battery 60.

The first or second switch 52 or 53 can include an insulated gate bipolar transistor (IGBT) a MOSFET switch, or any suitable switching element configured to performing a switching function. In embodiments where the first switch 52 or the second switch 53 is a MOSFET switch, first ends of switches 52 or 53 may be source terminals of MOSFETs, and second ends may be drain terminals of MOSFETs.

The converter 50 configured as described above may perform an operation of the bidirectional converter that acts as a boost converter boosting the voltage of input power or a buck converter dropping the voltage of input power.

The converter 50 according to the embodiment of FIG. 2 is configured to perform a general bidirectional converting operation, and is configured with the third switch 54 coupled in parallel to the first inductor 51 so as to form a direct charging/discharging current path to the battery 60 without passing through the first inductor 51. In particular, the converter 50 further includes a third switch 54 that couples the first terminal of the battery 60 and the node n1 between the first and second switches 52 and 53. Thus, if the third switch 54 is turned on, the charging/discharging current path is formed immediately to the battery 60 without passing through the first inductor 51. In this embodiment, the operations of the first to third switches 52-54 are controlled by the controller 80 shown in FIG. 1.

The inverter 30 according to the illustrated embodiment of FIG. 2 includes a full-bridge structure configured with four switches 31 to 34. The inverter 30 is implemented as an insulated full-bridge structure in which the primary and secondary sides of the inverter 30 are divided by a non-contact transformer 38.

In the non-contact transformer 38, a first winding Q1 at a primary side of the non-contact transformer 38 and a second winding Q2 at a secondary side of the non-contact transformer 38 are configured to be separated from each other by a certain gap therebetween. The non-contact transformer 38 can be advantage in that chances of electric shock can be minimized, as well as other failures related to electrical contacts. In this embodiment, the first and second windings Q1 and Q2 may be implemented as coils.

In the inverter 30, as shown in FIG. 2, the first to fourth switches 31 to 34 are provided on the primary side of the non-contact transformer 38. In addition, a fifth switch 35, a diode D, and a second inductor 36 are connected in series to one another on the secondary side. In addition, a second capacitor C2 is connected in parallel to the second inductor 36.

The diode D can perform a function of rectifying power transferred to an output thereof, and the second capacitor C2 is used to obtain a constant output characteristic according to variations of the load 2 connected to the secondary side.

The inverter 30 according to this embodiment is configured to perform a bidirectional inverting operation through first to fourth switches 31 to 34 provided on the primary side of the inverter 30 and the second inductor 36 provided on the secondary side of the inverter 30. The inverter 30 further includes the fifth switch 35 provided in series on the secondary side of the non-contact transformer 38 so as to control the coupling on the secondary side.

In particular, if the fifth switch 35 is turned on, the inverter 30 performs a general bidirectional inverting operation. If the fifth switch 35 is turned off, the first winding Q1 on the primary side of the non-contact transformer 38 performs a function of the inductor, which generates reactive power, and provides, to the battery, charging/discharging current caused by the generated reactive power.

More specifically, according to some embodiments described in FIG. 2, among the switches of the full-bridge structure provided on the primary side of the inverter 30, the first switch 31 couples the first plate of the first capacitor C1 included in the DC linker 20 to a first end of the first winding Q1. That is, a first end of the first switch 31 is connected to the first plate of the first capacitor C1, and a second end of the first switch 31 is connected to the first end of the first winding Q1.

Additionally, the second switch 32 couples the first end of the first winding Q1 to the second end of the first capacitor C1 included in the DC linker 20 and the second terminal of the battery 60. That is, a first end of the second switch 32 is connected to the first end of the first winding Q1, and a second end of the second switch 32 is connected to the second plate of the first capacitor and the second terminal of the battery 60.

Additionally, the third switch 33 couples the first plate of the first capacitor C1 included in the DC linker 20 to a second end of the first winding Q1. That is, a first end of the third switch 33 is connected to the first plate of the first capacitor C1, and a second end of the third switch 33 is connected to the second end of the first winding Q1.

Additionally, the fourth switch 34 couples the second end of the first winding Q1 to the second plate of the first capacitor C1 included in the DC linker 20 and the second terminal of the battery 60. That is, a first end of the fourth switch 34 is connected to the second end of the first winding Q1, and a second end of the fourth switch 34 is connected to the second plate of the first capacitor C1 and the second terminal of the battery 60.

The first to fourth switches 31 to 34 may be implemented as an insulated gate bipolar transistor (IGBT), a MOSFET switch, or any suitable switching element configured to performing a switching function. In a case where the first to fourth switches 31 to 34 are MOSFET switches, first ends of the switches may be source terminals of MOSFETs, and second ends of the switches may be drain terminals of MOSFETs.

The inverter 30 configured as described above may perform a bidirectional inverting operation of converting a DC voltage into an AC voltage or rectifying an AC voltage to a DC voltage.

The inverter 30 according to this embodiment performs the general bidirectional inverting operation, and further includes the fifth switch 35 configured to decouple the secondary side from the primary side so as to generate charging/discharging current transferred to the battery 60 using the first winding Q1.

That is, in the embodiment shown in FIG. 2, the fifth switch 35 is configured to couple a first end of the second winding Q2 on the secondary side of the non-contact transformer 38 to an anode electrode of the diode D. The diode D is configured to be in series with the second winding Q2 when the fifth switch is switched on, and forward biased when a current flows in a direction from the second winding Q2 towards the second inductor L2 through the diode D.

Thus, if the fifth switch 35 is turned off, the secondary side of the non-contact transformer 38 is decoupled from the primary side, and accordingly, the current in the first winding Q1 provided at the primary side of the non-contact transformer 38 can be transferred to the battery 60 rather than the load 2 or the grid 1.

Preferably, both switches 41 and 42 provided in the grid linker 40 are configured to be turned off so that the voltage converted by the inverter 30 is not transferred to the load 2 or the grid 1.

In the embodiment of FIG. 2, first to fifth switches 31, 32, 33, 34 and 35 of the inverter 30 and the switches 41 and 42 provided in the grid linker 40 are configured to be controlled by the controller 80 shown in FIG. 1.

Figure 3A:
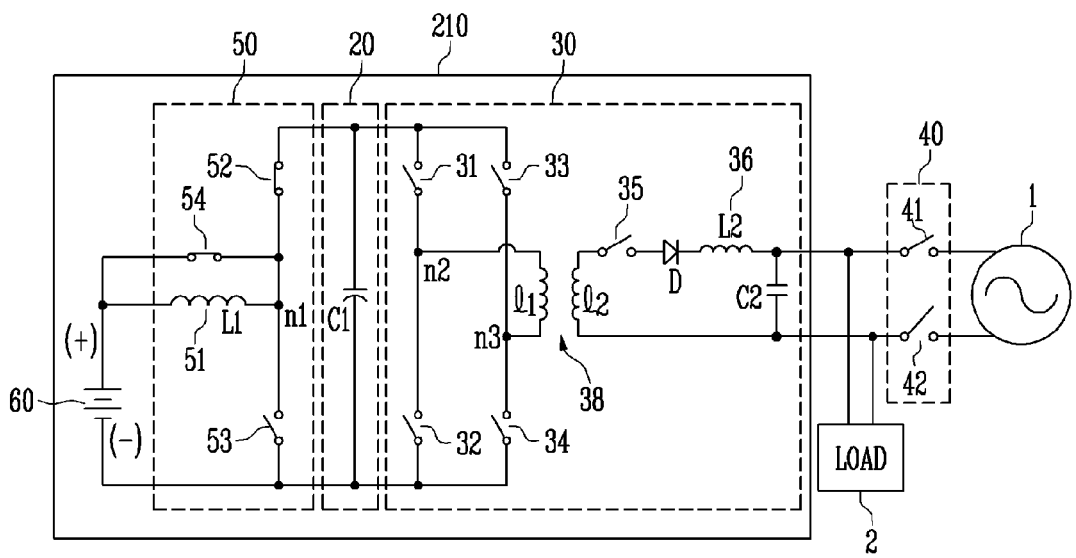
FIGS. 3A to 3C are circuit diagrams illustrating the battery temperature control system of FIG. 2 during operation according to various embodiments.
Figure 3B:
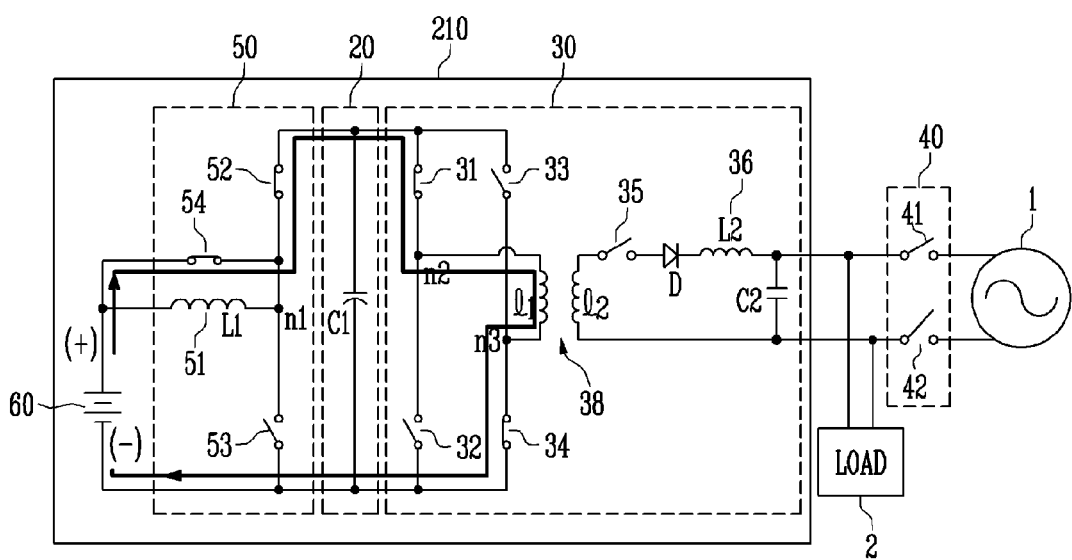
Figure 3C:
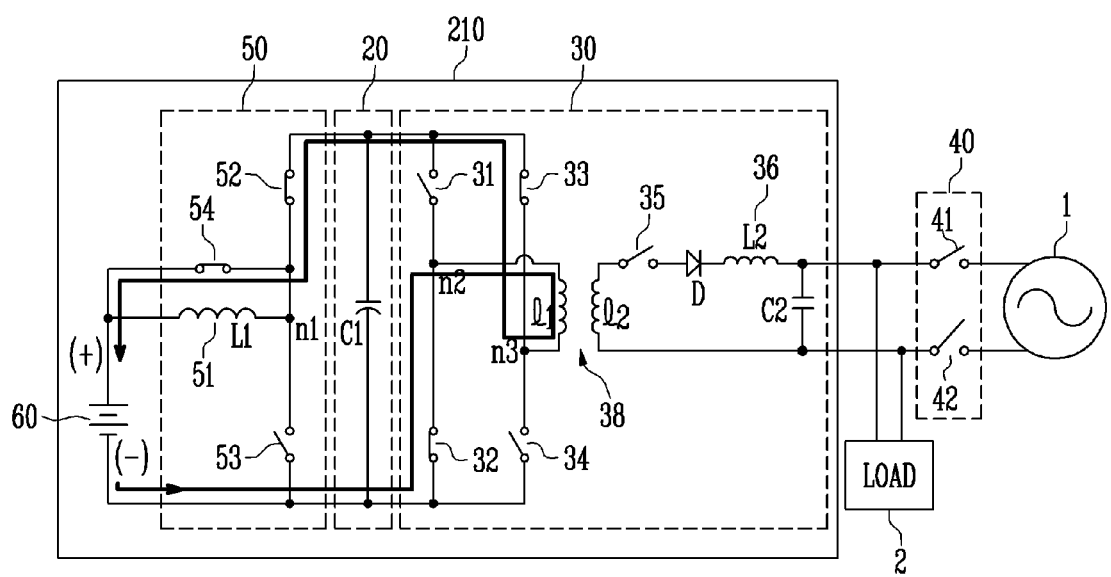

FIGS. 3A to 3C are circuit diagrams illustrating the battery temperature control system of FIG. 2 during operation according to various embodiments.

A method of operation of the temperature control system 100 is described herein with reference to FIGS. 2 and 3, corresponds to circumstances where the controller 80 determines that the temperature of the battery has been maintained below a normal operation temperature for a predetermined duration. In particular, the controller 80 is configured to periodically receive information on the battery 60 through the BMS coupled to the battery 60, and the controller 80 can determine that the temperature of the battery 60 has been maintained below a normal operation temperature for a certain period of time.

When the controller 80 determines that the temperature of the battery has been maintained below a normal operation temperature for a predetermined duration, the controller 80 controls the operation of the temperature control system 210 shown in FIG. 2 so as to increase the temperature of the battery 60. In this case, the routine operation of the energy storage system 100 is suspended until the battery 60 recovers the normal temperature.

During the period of control the temperature of the battery 60, the controller 80 performs the operation of increasing the temperature of the battery 60 by decoupling the the grid 1 and the load 2 from the energy storage system 100 and generating charging/discharging current in the battery 60 using the first winding Q1 of the non-contact transformer 38 provided in the inverter 30 of the energy storage system 100.

According to one embodiment, referring to FIGS. 1 and 3A, the method of operation of the temperature control system 100 includes determining that the temperature of the battery 60 has been maintained below a normal temperature for a predetermined duration. The method additionally includes decoupling a secondary side from a primary side of the non-contact transformer 38 of the inverter 30. In particular, once the controller 80 senses the low-temperature state of the battery 60 through the BMS provided to the battery 60, the controller 80 decouples the secondary side from the primary side of a non-contact transformer by decoupling from the energy storage system 100 the load 2 and the grid 1 by turning off the fifth switch 35 of the inverter 30 and the switches 41 and 42 of the grid linker 40.

The method additionally includes performing a charging operation by forming a charging current path through which a charging current generated by an inductance of the first winding Q1 flows in a charging direction from a first end of the first winding Q1 through the second end of the winding Q1 towards a first (e.g., positive) terminal of the battery 60. The method additionally includes performing a discharging operation by forming a discharging current path through which a discharging current generated by the inductance of the first winding Q1 flows in a discharging direction from a first end of the first winding Q1 through the second end of the winding towards a second (e.g., negative) terminal of the battery. The method further includes alternatingly repeating charging and discharging operations until the temperature of the battery has been restored to the normal temperature.

In more detail, upon determining that the temperature of the battery 60 has been maintained below a normal temperature for a predetermined duration a current path is formed so that the battery 60 can be connected directly to the inverter 30 without passing through the first inductor 51 of the converter 50 by turning on the third switch 54 included in the converter 50 and the first switch 52 connected to the first plate of the first capacitor C1 provided in the DC linker 20.

Subsequently, two pairs of the four switches implemented into the full-bridge structure, provided in the inverter 30, are alternately operated, thereby repetitively performing the charging/discharging operation of the battery.

That is, referring to FIG. 3B, the controller 80 turns on the first and fourth switches 31 and 34 among the switches included in the inverter 30, and turns off the second and third switches 32 and 33 among the switches included in the inverter 30.

In this case, as shown in FIG. 3B, a discharging path is formed from the first terminal (+) of the battery 60 to the second terminal (−) of the battery 60 via the third and first switches 54 and 52 of the converter 50, the first plate of the first capacitor C1 provided in the DC linker 20, the first switch 31 of the inverter 30, the first winding Q1 of the inverter 30 and the fourth switch 34 of the inverter 30.

That is, according to FIG. 3B, discharging current flows in the battery 60 through the discharging path.

Referring to FIG. 3C, the controller 80 turns on the second and third switches 32 and 33 among the switches included in the inverter 30, and turns off the first and fourth switches 31 and 34 among the switches included in the inverter 30.

In this case, a charging path having the opposite direction to the discharging path of FIG. 3B is formed. Accordingly, the reactive power stored in the first winding Q1 of the inverter 30 is transferred to the battery 60, so that the battery 60 can be charged.

As shown in FIG. 3, the charging path is formed from the second terminal (−) of the battery 60 to the first terminal (+) of the battery 60 via the second terminal of the first capacitor C1 provided in the DC linker 20, the second switch 32 and the first winding Q1 of the inverter 30, the third switch 33 of the inverter 30, the first terminal of the first capacitor C1 provided in the DC linker 20, and the first and third switches 52 and 54 of the converter 50.

The controller 80 repetitively performs the operations of FIGS. 3B and 3C, so that charging/discharging current repetitively flows in the battery 60 until the temperature of the battery 60 returns to a normal temperature range. At this point, the controller 80 completes the temperature control operation and returns the energy storage system 100 to perform routine operations. That is, the inverter 30 performs a basic bidirectional inverting operation by turning on the fifth switch 35 provided at the secondary side of the inverter 30, and the energy storage system 100 is connected to the load 2 and the grid 1 by turning on the switches 41 and 42 of the grid linker 40. Similarly, the converter 50 performs only a basic bidirectional converting operation by turning off the third switches 54 included in the converter 50. That is, the charging/discharging current path formed in the operation of the temperature control system is blocked.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof

What is claimed is:

1. A battery temperature control system comprising:
a battery;
a converter electrically connected to the battery and comprising first and second switches and a first inductor, the converter configured to boost or drop an output voltage of the battery into an output voltage of converter;
a DC linker electrically connected to the converter and comprising a first capacitor, the DC linker configured to stabilize the output voltage of the converter; and
an inverter electrically connected to the DC linker and comprising a non-contact transformer, the non-contact transformer comprising a first winding on a primary side and a second winding on a secondary side, the first and second windings separated from each other by a gap therebetween, the non-contact transformer further comprising first to fourth switches provided on the primary side and a fifth switch and a second inductor provided on the secondary side.

2. The battery temperature control system of claim 1, wherein a first end of the first inductor is connected to a first terminal of the battery, wherein the first switch of the converter is between a second end of the first inductor and a first plate of the first capacitor, and wherein the first switch of the converter being configured to connect the first terminal of the battery to the first plate of the linker capacitor when switched on, and the second switch is configured to connect the second end of the first inductor and a second terminal of the battery when switched on.

3. The battery temperature control system of claim 2, wherein the converter further comprises a third switch connected in parallel to the first inductor and configured to directly connect the first terminal of the battery to the first plate of the first capacitor when switched on.

4. The battery temperature control system of claim 1, wherein the first to fourth switches on the primary side of the inverter form a full-bridge structure.

5. The battery temperature control system of claim 4, wherein
the first switch of the inverter is connected between the first plate of the first capacitor and a first end of the first winding;
the second switch of the inverter is connected between the first end of the first winding and the second terminal of the battery;
the third switch of the inverter is connected between the first plate of the first capacitor and a second end of the first winding; and
the fourth switch of the inverter is connected between the second end of the first winding and the second terminal of the battery.

6. The battery temperature control system of claim 1, wherein the fifth switch of the inverter is between the second winding and the second inductor, the fifth switch being configured to connect the second winding and the second inductor in series.

7. The battery temperature control system of claim 6, further comprising a diode between the fifth switch and the second inductor.

8. The battery temperature control system of claim 7, wherein the diode is configured to be in series with the second winding when the fifth switch is switched on and forward biased when a current flows in a direction from the second winding towards the second inductor through the diode.

9. The battery temperature control system of claim 8, wherein the inverter further comprises a second capacitor configured to connect a first end and a second end of the second winding through the second inductor when the fifth switch is switched on.

10. A battery temperature control method comprising:
determining that the temperature of the battery has been maintained below a normal operation temperature for a predetermined duration;
decoupling a secondary side from a primary side of a non-contact transformer of an inverter in the energy storage system, the primary side including a winding having a first end and a second end;
performing a charging operation by forming a charging current path through which a charging current generated by an inductance of the winding flows in a charging direction from a first end of the winding through the second end of the winding towards a first terminal of the battery;
performing a discharging operation by forming a discharging current path through which a discharging current generated by the inductance of the winding flows in a discharging direction from a first end of the winding through the second end of the winding towards a second terminal of the battery; and
alternatingly repeating charging and discharging operations until the temperature of the battery has been restored to the normal operation temperature.

11. The battery temperature control method of claim 10, wherein alternatingly repeating charging and discharging operations is performed through alternatingly switching a first pair of switches and a second pair of switches on the primary side.

12. The battery temperature control method of claim 11, wherein the first pair of switches comprises a first switch configured to connect the first end of the winding and a first plate of a first capacitor when switched on and a fourth switch configured to connect the second end of the winding and a second plate of the first capacitor when switched on.

13. The battery temperature control method of claim 11, wherein the second pair of switches comprises a second switch configured to connect the first end of the winding and a second plate of a first capacitor when switched on and a third switch configured to connect the second end of the winding and a first plate of the first capacitor when switched on.

14. The battery temperature control method of claim 11, further comprising decoupling a grid and a load from the energy storage system.

15. The battery temperature control method of claim 11, further comprising coupling the load and the grid to the energy storage system after the temperature of the battery has been restored to the normal operation temperature and blocking the formed charging and discharging current paths.

* * * * *